Figure 1:
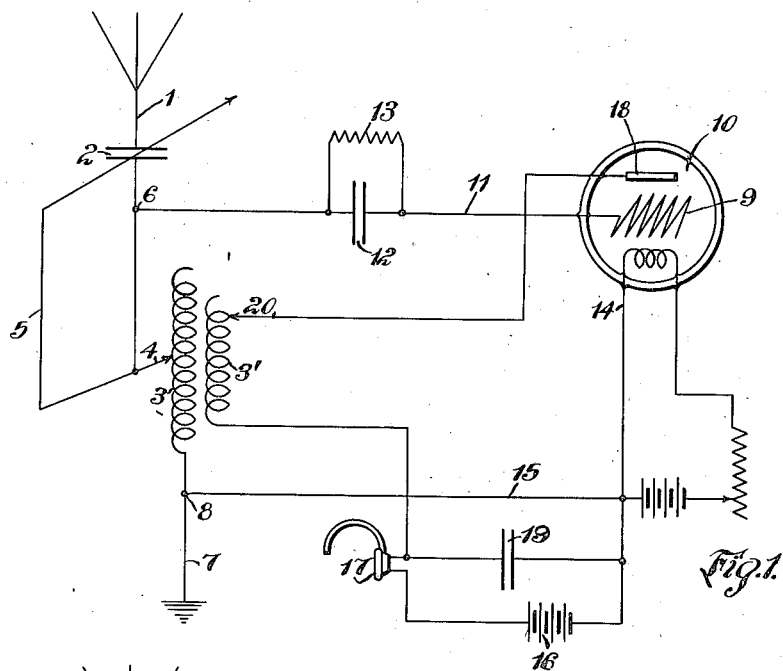

Nov. 11, 1924.

F. CONRAD 1,515,186

APERIODIC RECEIVER SYSTEM

Filed June 3, 1920

WITNESSES:

INVENTOR
Frank Conrad
BY
ATTORNEY

Patented Nov. 11, 1924.

1,515,186

UNITED STATES PATENT OFFICE.

FRANK CONRAD, OF PITTSBURGH, PENNSYLVANIA, ASSIGNOR TO WESTINGHOUSE ELECTRIC & MANUFACTURING COMPANY, A CORPORATION OF PENNSYLVANIA.

APERIODIC RECEIVER SYSTEM.

Application filed June 3, 1920. Serial No. 386,323.

*To all whom it may concern:*

Be it known that I, FRANK CONRAD, a citizen of the United States, and a resident of Pittsburgh, in the county of Allegheny and State of Pennsylvania, have invented a new and useful Improvement in Aperiodic Receiver Systems, of which the following is a specification.

My invention relates to wireless telegraphic systems and more especially to systems in which an inductive coupling is employed.

Heretofore, in the art of wireless telegraphy, wherever inductive couplings have been employed it has been usual to provide a relatively large amount of magnetic leakage between the primary and secondary windings. I have found, however, that there are manifest advantages to be obtained in producing a relatively tight coupling between the antenna and the receiver circuits. In order to gain full advantage of such tight coupling, I provide, as a feature of my invention, a capacity loading for the antenna. This feature is of especial importance in connection with regenerator circuits employing a triode. Thus, it is a further feature of my invention to adopt a tight coupling between primary and secondary in regenerator circuits in order to secure simplicity of design and operation and also regenerative action for incoming signals for all manner of wave lengths, with a minimum of necessary adjustment. In a sense, therefore, my invention may be said to be a form of aperiodic regenerator receiver without the use of leakage reactances in either the primary or the secondary circuit. This is noteworthy when it is considered that, heretofore, in order to secure regenerator action, it was thought that individual tuning of the primary and secondary circuits was considered necessary.

As a further feature of my invention, I aim to provide an automatic control for the loading capacitance of the antenna and the primary coupling coil inductance, leaving the separate adjustment of the secondary turns as a further means for securing the maximum strength of signal possible.

It should be noted that, where regenerative circuits have the coupling forming part of the antenna circuit, with no variable condenser in series, changing the number of turns in the primary coil of the coupling necessitates changing the secondary turns. This applies to loose as well as to tight couplings. I have found that, for a given wave length, by introducing a suitable variable capacity into the antenna circuit, it is possible to so arrange matters with respect to the secondary turns of the coupling that the latter needs practically no adjustment. To obtain the best results, that is, to obtain the optimum regenerator coupling, independent adjustment of the secondary may be resorted to if desired.

Figure 2:
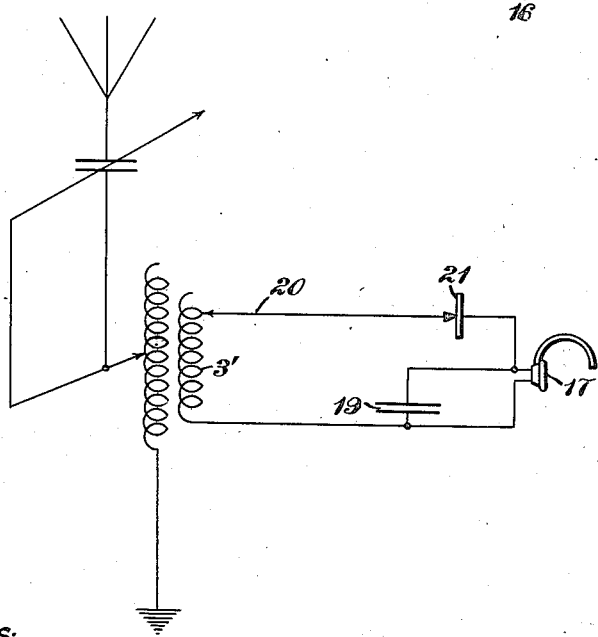

Fig. 1 is a diagrammatic view of an embodiment of my invention as applied to a triode connected for regenerator action; Fig. 2 is a simplified diagrammatic view of an embodiment of my invention applied to a simple detector circuit.

An antenna 1 is connected to a loading capacitance 2 in series with a primary inductance 3 coupled tightly to a secondary inductance 3' by means of a variable connection 4 co-operating with the primary inductance. I am enabled to secure simultaneous variations in the capacitance and primary inductances in opposite directions by means of a connecting member 5. One end of the primary inductance is connected to the junction 6 arranged between the capacitance 2 and the variable connection 4. On the other hand, the other end of the primary inductance 3 is connected to the ground wire 7 by means of a junction 8.

Preferably, I connect a grid 9 of a triode 10 by means of a lead 11 to the junction 6 between the antenna capacitance and inductance. In the circuit of the lead 11 I locate also a grid condenser 12 shunted by a grid leak 13. Again, the filament 14 of the triode is connected to the junction 8 of the antenna by means of a suitable lead 15. Such filament 14 is also connected to the secondary coil 3' through a battery 16 and telephone set 17. The other end of such secondary inductance is connected adjustably to the plate 18 by means of an adjustable lead 20. In general, I provide a condenser 19 to shunt both the telephone set 17 and the battery 16.

In the simplified circuit (Fig. 2) where a detector 21 is employed, the one end of the secondary coupling coil 3' is connected to the telephone set 17, whereas the other end of the coupling coil is adjutsably connected to the detector 21 in circuit with the telephone set 17 by means of a lead 20. The telephone set in Fig. 2 is similarly shunted by means of a condenser 19 in accordance with the usual practice.

In the operation of my device, I adjust the variable capacitance 2 and the variable inductance 3 simultaneously by means of the connecting member 5 so as to obtain the maximum strength of signal for an incoming wave. It should be stated that such strength of signal will be greater in proportion as the coupling between primary and secondary is made closer. This, at first sight, would appear to be contrary to expectation, for, with the usual understanding of the operation of regenerator circuits, it had been thought that too tight a coupling would mitigate especially against all possibility of regenerator action.

Having described the nature of my invention, what I claim is:

1. A method of operating a regenerator circuit with a tight coupling between the plate and grid circuits thereof, comprising the step of introducing one element of said tight coupling into an antenna circuit and then simultaneously varying said element and a condenser interposed in said antenna circuit in such manner that said antenna circuit may be tuned while maintaining substantially the correct regenerator coupling for all wave-lengths within the range of said antenna circuit.

2. In combination, a regenerative amplifying system having coupled inductors, an antenna circuit including one of said inductors, a condensive tuning reactor included in said antenna circuit, and single operating means for varying said last mentioned inductor and said tuning reactor.

3. In combination, a regenerative amplifying system having coupled feed-back inductors, an antenna circuit including one of said inductors, a condensive tuning reactor included in said antenna circuit, and single operating means for simultaneously varying said last-mentioned inductor and said tuning reactor, said operating means being so co-ordinated as to vary the magnitude of said last-mentioned inductor oppositely to the variation in the magnitude of said tuning inductor.

4. The combination with a regenerative system having tightly coupled inductors, of a ground wire connected to one end of one of said inductors and an antenna connected through a condensive reactor to the other end of said last-mentioned inductor, and single operating means for varying the inductance of said last-mentioned inductor and for simultaneously varying the capacitance of said condensive reactor in an opposite direction.

5. In combination, a regenerative amplifying system having a pair of coupled inductors, an antenna circuit including one of said inductors, a condensive reactor included in said antenna circuit, and common adjusting means for varying said last-mentioned inductor and said reactor in such manner as to require substantially no adjustment of the other inductor.

6. In combination, a regenerative amplifying system having coupled inductors but no tuning condensers, an antenna circuit including one of said inductors, a capacitance in series with said antenna, and a common adjusting means for varying said capacitance and said last-mentioned inductor in such manner as to require substantially no adjustment of the remaining inductor of said coupled inductors, said remaining inductor constituting the secondary element of said regenerative system.

7. In combination, a regenerative system having a pair of coupled feed-back inductors, an antenna circuit including one of said inductors, a condensive reactor serially included in said antenna circuit, common adjusting means for varying said last-mentioned inductor and said reactor in such manner as to require substantially no adjustment of said remaining inductor of said pair of coupled inductors, and further means for adjusting the coupling of said regenerative system.

8. The combination with a regenerative system having a pair of coupled feed-back inductive reactors, but no tuning condensive reactors, of an antenna circuit including one of said pair of inductive reactors, a condenser also included in said antenna circuit, common adjusting means for varying said last-mentioned inductive reactor and said condenser in such manner as to require substantially no adjustment of the remaining inductive reactor of said pair of reactors, and further means for adjusting the coupling of said regenerative system.

9. A regenerative, continuous-wave signaling system including an amplifying device having an output circuit and a control circuit, an inductive regenerative coupling between said output and control circuits, a tuned energy-translating circuit, means for coupling said output and control circuits to said tuned circuit, and means for simultaneously varying the tuning of said tuned circuit and the tightness of said regenerative coupling in such manner that the regenerative coupling will remain substantially at optimum value or at any other relative value regardless of the tuning of said tuned circuit.

10. A regenerative radio receiving system comprising a tuned circuit carrying in-coming signal-currents, an amplifying device having an output circuit and a control circuit, a regenerative coupling between said output and control circuits, means for coupling said output and control circuits to said tuned circuit, means for simultaneously varying the tuning of said tuned circuit and the tightness of said regenerative coupling in such manner that the regenerative coupling will remain substantially at optimum value or at any other relative value regardless of the tuning of said tuned circuit, and means for independently adjusting the tightness of said regenerative coupling.

11. A regenerative radio receiving system comprising a tuned circuit carrying in-coming signal-currents, said tuned circuit including a variable inductance device, an amplifier having a control circuit connected across said variable inductance device and having an output circuit including a feed-back coil inductively related to said variable inductance device, and common means for simultaneously adjusting both the tuning of said tuned circuit and the tightness of the feed-back coupling in a predetermined manner such that regenerative operation of said amplifier may be secured for all of said adjustments.

12. A wireless system comprising an antenna circuit including a main inductive tuning reactor and an auxiliary tuning reactor, an amplifier having output and control circuits, one of said amplifier circuits being conductively coupled to said antenna circuit, means for inductively coupling the other of said amplifier circuits to said main tuning reactor, and common means for simultaneously varying both of said tuning reactors in a predetermined manner such that the regenerative operation of said amplifier is maintained at all times without further adjustment.

13. The combination with a regenerative amplifier system having coupled feed-back inductors, of an oscillating circuit tightly coupled thereto, and means for varying the period of said oscillating circuit and for maintaining the regenerative operation of said amplifier system approximately constant throughout said variation.

14. A wireless system comprising an antenna circuit including a main inductive tuning reactor and an auxiliary condensive tuning reactor, an amplifier having a control circuit connected across said main tuning reactor and having an output circuit including a feed-back coil inductively related to said main tuning reactor, and common means for simultaneously varying both of said tuning reactors in a predetermined manner such that the regenerative operation of said amplifier is maintained at all times without further adjustment.

15. The method of operating a regenerative feed-back system having coupled elements in connection with an adjustably tuned oscillation circuit including a tuning condenser, which consists in simultaneously varying one element of said coupled elements only and said condenser to cause both the tuning and the feed-back coupling to vary in such relation that the regenerative operation of said feed-back system is maintained at all times without further adjustment.

In testimony whereof, I have hereunto subscribed my name this 1st day of June, 1920.

FRANK CONRAD.